(12) United States Patent
Sanayei

(10) Patent No.: US 8,432,988 B2
(45) Date of Patent: Apr. 30, 2013

(54) SYSTEM AND METHOD FOR QUANTIZATION OF CHANNEL STATE INFORMATION

(75) Inventor: Shahab Sanayei, Richardson, TX (US)

(73) Assignee: FutureWei Technologies, Inc., Plano, TX (US)

( * ) Notice: Subject to any disclaimer, the term of this patent is extended or adjusted under 35 U.S.C. 154(b) by 872 days.

(21) Appl. No.: 12/497,118

(22) Filed: Jul. 2, 2009

(65) Prior Publication Data

US 2010/0002797 A1 Jan. 7, 2010

Related U.S. Application Data

(60) Provisional application No. 61/077,771, filed on Jul. 2, 2008.

(51) Int. Cl.
  *H04B 7/02* (2006.01)
  *H04L 1/02* (2006.01)
(52) U.S. Cl.
  USPC .......................................................... 375/267
(58) Field of Classification Search ............. 375/219, 375/224, 226, 260, 267, 295, 296, 316; 455/63.1, 455/67.11, 403, 446, 500, 524
  See application file for complete search history.

(56) References Cited

U.S. PATENT DOCUMENTS

| 4,742,533 A | 5/1988 | Weidner et al. |
| 7,917,176 B2* | 3/2011 | Khojastepour et al. .... 455/562.1 |
| 2006/0056335 A1 | 3/2006 | Lin et al. |
| 2006/0291544 A1 | 12/2006 | Fischer et al. |
| 2007/0104163 A1 | 5/2007 | Kim |
| 2007/0211804 A1* | 9/2007 | Haupt et al. ................... 375/242 |
| 2007/0211823 A1* | 9/2007 | Mazzarese et al. ............ 375/299 |
| 2007/0226287 A1* | 9/2007 | Lin et al. ........................ 708/490 |
| 2008/0003948 A1* | 1/2008 | Mitran ........................ 455/67.11 |
| 2008/0112500 A1* | 5/2008 | Pan et al. ....................... 375/267 |
| 2008/0187061 A1* | 8/2008 | Pande et al. ................... 375/260 |

FOREIGN PATENT DOCUMENTS

| CN | 101019342 A | 8/2007 |
| CN | 101110623 A | 1/2008 |

OTHER PUBLICATIONS

Ravindran, N., et al., "MIMO Broadcast Channels with Block Diagonalization and Finite Rate Feedback," IEEE International Conference on Acoustics, Speech, and Signal Processing, Apr. 15-20, 2007 pp. 13-16.

International Search Report and The Written Opinion of the International Searching Authority, International Application No. PCT/US2009/049583, Applicant: Futurewei Technologies, Inc., Nov. 2, 2009, 11 pages.

Extended European Search Report, Application No. 09774544.2-1237/2294740, PCT/US2009049583, Applicant: Huawei Technologies Co., Ltd., Oct. 28, 2011, 8 pages.

(Continued)

*Primary Examiner* — David C. Payne
*Assistant Examiner* — Syed Haider
(74) *Attorney, Agent, or Firm* — Slater & Matsil, L.L.P.

(57) ABSTRACT

A system and method for quantization of channel state information is provided. A method for operating in a wireless communications system includes estimating a communications channel between a controller and a mobile device, thereby producing a channel estimate, parameterizing the channel estimate with principal angle vectors $\Theta$ and $\Phi$, quantizing the principal angle vectors, thereby producing quantized values, and transmitting the quantized values to the controller.

21 Claims, 3 Drawing Sheets

OTHER PUBLICATIONS

Jindal, N., "MIMO Broadcast Channels With Finite-Rate Feedback," IEEE Transactions on Information Theory, vol. 52, No. 11, Nov. 2006, pp. 5045-5060.

Love, D.J., et al., "What is the Value of Limited Feedback for MIMO Channels?," Adaptive Antennas and MIMO Systems for Wreless Communications, IEEE Communications Magazine, Oct. 2004, pp. 54-59.

First Chinese Office Action received in Chinese Application No. 200980131990.X mailed Aug. 31, 2012, 16 pages.

* cited by examiner

SYSTEM AND METHOD FOR QUANTIZATION OF CHANNEL STATE INFORMATION

This application claims the benefit of U.S. Provisional Application No. 61/077,771, filed on Jul. 2, 2008, entitled "Multi-Scale Quantization of Channel State Information," which application is hereby incorporated herein by reference.

TECHNICAL FIELD

The present invention relates generally to wireless communications, and more particularly to a system and method for quantization of channel state information.

BACKGROUND

In order to achieve better channel utilization and increase overall performance, multiple transmission and multiple reception antennas (also commonly referred to as multiple input, multiple output (MIMO)) at both base station (BS) and mobile station (MS) are considered.

The knowledge of channel state information (CSI) is an important factor in wireless communication systems, particularly multi-user MIMO (MU-MIMO) systems. Codebook based quantization is a known method for feeding back the channel state information, as taught by Love, et al. ("What is the Value of Limited Feedback for MIMO Channels?" *IEEE Communication Magazine*, Vol. 42 pp 54-59. October 2004). As is also known, the precision of channel state information plays a key role in achieving the desired gains of Multi-user MIMO systems, per Jindal, ("MIMO Broadcast Channels with Finite Rate Feedback," *IEEE Trans. Information Theory*, Vol. 52, No. 11, pp. 5045-5059, November 2006).

However, with MIMO systems, the size of the codebooks tends to grow dramatically with increased number of antennas and or codeword resolution. The increased codebook size increases storage requirements as well as increases codeword search times.

Therefore, there is a need for a system and method for providing CSI feedback without having large storage or computation requirements that increases dramatically with increased resolution or antennas. Furthermore, a need exists for a system and method for providing CSI feedback resolution with a flexible degree of resolution with simple quantization calculation that does not perform a complex, time consuming search.

SUMMARY OF THE INVENTION

These and other problems are generally solved or circumvented, and technical advantages are generally achieved, by embodiments of a system and method for quantization of channel state information.

In accordance with an embodiment, a method for operating in a wireless communications system is provided. The wireless communications network having a controller and a mobile device. The method includes estimating a communications channel between the controller and the mobile device, thereby producing a channel estimate, and parameterizing the channel estimate with principal angles, thereby producing principal angle vectors $\Theta$ and $\Phi$. The method also includes quantizing the principal angle vectors, thereby producing quantized values, and transmitting the quantized values to the controller.

In accordance with another embodiment, a method for operating in a wireless communications system is provided. The wireless communications network having a controller and a mobile device. The method includes receiving quantized values of a channel estimate from the mobile device, reconstructing the channel estimate from the quantized values, adjusting a transmitter of the controller using the channel estimate, and using the adjusted transmitter to transmit to the mobile device. The received quantized values comprise quantized principal angle vectors.

In accordance with another embodiment, a method for operating in a wireless communications system is provided. The wireless communications network having a controller and a mobile device. The method includes estimating a communications channel between the controller and the mobile device, thereby producing a channel estimate, and parameterizing the channel estimate with principal angles, thereby producing principal angle vectors $\Theta$ and $\Phi$. The method also includes quantizing the principal angle vectors at a first partial resolution, thereby producing a first set of quantized values, and transmitting the first set of quantized values to the controller. The method further includes quantizing the principal angle vectors at a second partial resolution, thereby producing a second set of quantized values, and transmitting the second set of quantized values to the controller.

An advantage of an embodiment is that an easy to implement, hierarchical, and flexible system and method for quantizing channel state information is provided. The storage and computation requirements do not significantly increase with increased resolution or number of transmit or receive antennas.

A further advantage of an embodiment is that flexible CSI resolution is supported through one-shot or multi-scale (multi-stage) CSI quantization. Fast CSI quantization at moderate resolution is supported through a one-shot CSI quantization, while if higher resolutions are desired, multiple successive quantizations may be used to provide the desired resolution.

Yet another advantage of an embodiment is that the computation of the quantized vector is simple and does not require an exhaustive search.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a MIMO wireless communications system that makes use of channel state information to improve overall system efficiency. The MIMO wireless communications may be single-user (SU-MIMO) or multi-user (MU-MIMO) and may be compliant with any of a variety of technical standards, such as Long Term Evolution (LTE), LTE-Advanced, WiMAX, IEEE 802.16, and so forth.

Figure 1:
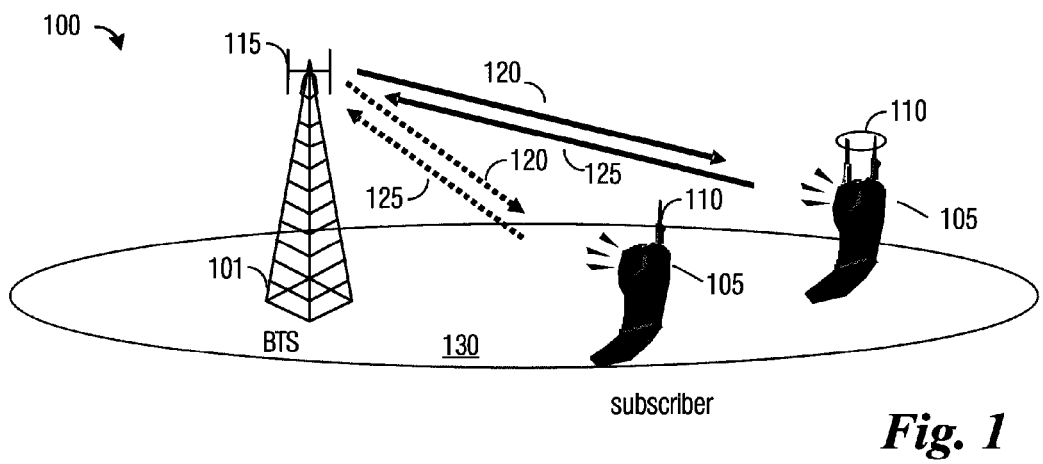
FIG. 1 is a diagram of a wireless communication system.

FIG. 1 illustrates a wireless communication system 100. Wireless communications system 100 includes a base transceiver station (BTS) 101 and a plurality of subscriber units 105, which may be mobile or fixed. BTS 101 and subscriber units 105 communicate using wireless communication. Base transceiver stations may also be referred to as base stations, Node Bs, enhanced Node Bs, and so forth, while subscriber units may also be referred to as mobile stations, terminals, mobile devices, user equipment, and the like.

BTS 101 has a plurality of transmit antennas 115 while subscriber units 105 have one or more receive antennas 110. BTS 101 sends control information and data to subscriber units 105 through a downlink (DL) channel 120 while subscriber units 105 send control information and data to BTS 101 through uplink (UL) channel 125.

Subscriber units 105 may send control information (including channel state information) on uplink channel 125 to improve the quality of the transmission on downlink channel 120. BTS 101 may send control information on downlink channel 120 for the purpose of improving the quality of uplink channel 125. A cell 130 is a conventional term for the coverage area of BTS 101. It is generally understood that in wireless communication system 100 there may be multiple cells corresponding to multiple BTSs.

In applications that require precise CSI, the code-book based quantization methods lose their attractiveness. This is mainly due to the fact that for high precision CSI quantization, a code-book of a very large size is needed. Grassmannian code-books, despite their optimality for quantizing isotropic vectors, are not only hard to find but also (because of their lack of structure) are costly to store. Another problem with a highly dense code-book is search complexity. Unstructured code-books require a search time that exponentially grows with the number of feedback bits, making them unsuitable for practical purposes. Structured code-books such as DFT based code-books deviate from optimality as the code-book size increases.

On the other hand, in real systems, obtaining high resolution CSI feedback in one-shot might not be either possible (due to the limitations on the feedback channel) or preferable (due to the feedback mechanism). After sending an initial CSI feedback there may need to send additional refinement feedback information to increase the precision of the CSI feedback.

Figures 2, 3:
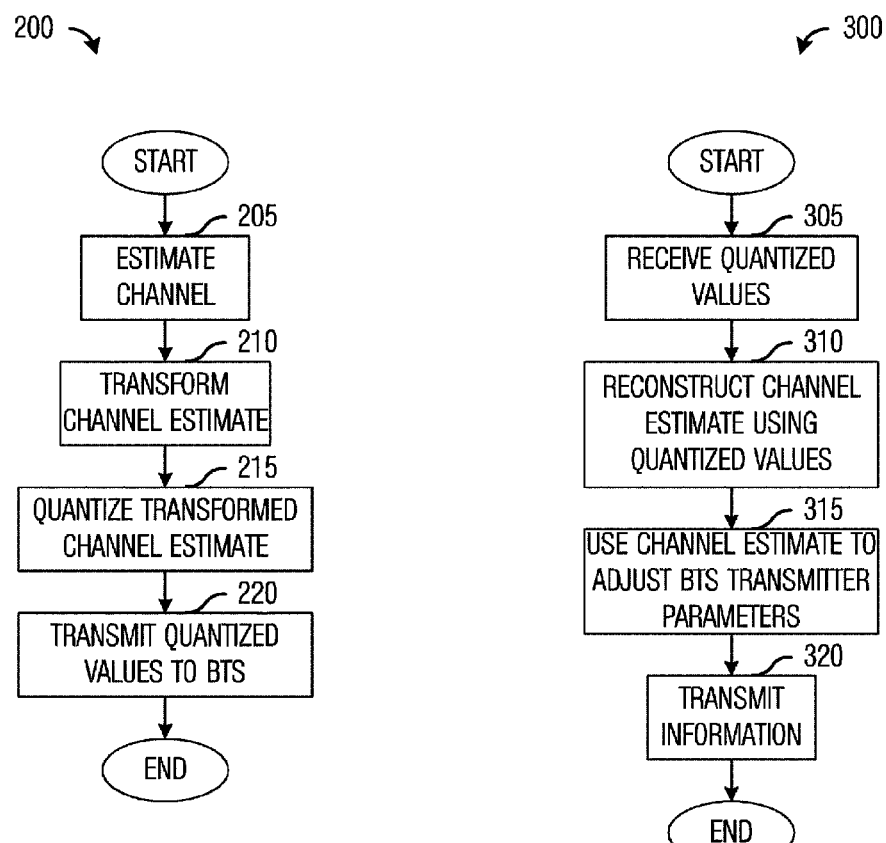
FIG. 2 is a flow diagram of subscriber unit operations in providing channel state information to a BTS.
FIG. 3 is a flow diagram of BTS operations in using channel state information in transmitting information to a subscriber unit.

FIG. 2 illustrates a flow diagram of subscriber unit operations 200 in providing channel state information to a BTS. Subscriber unit operations 200 may be indicative of operations taking place in a subscriber unit, such as subscriber unit 105, as the subscriber unit provides channel state information to a BTS, such as BTS 101. Subscriber unit operations 200 may be performed periodically, such as once during each frame or superframe. Alternatively, subscriber unit operations 200 may be performed once every few frames or superframes. Alternatively, subscriber unit operations 200 may be performed in response to the occurrence of an event. For example, subscriber unit operations 200 may be performed when a performance metric, such as an error rate of some form (frame error rate, bit error rate, packet error rate, and so forth), meets or exceeds a threshold.

Subscriber unit operations 200 may begin when the subscriber unit computes a channel estimate (block 205). The subscriber unit may compute the channel estimate by measuring pilots (pilot sequences) transmitted by the BTS, measuring reference sequences transmitted by the BTS, or by measuring transmissions made by the BTS over time.

After the subscriber unit computes the channel estimate, the subscriber unit may parameterize and then transform the channel estimate (block 210). The channel estimate h may be expressible as a unit norm vector $h \in C^{M \times 1}$ (i.e. $\|h\|=1$). The channel estimate may be parameterized as:

$$h = e^{j\psi} \begin{bmatrix} r_1 e^{j\varphi_1} \\ r_2 e^{j\varphi_2} \\ \vdots \\ r_M \end{bmatrix},$$

where $$\sum_{k=1}^{M} |r_k|^2 = 1, r_k \in \mathbb{R}$$

and $0 \leq \phi_k < \pi$. The vector $r=[r_1\ r_2\ \ldots\ r_M]^T$ is an m-dimensional unit norm real vector. Therefore, the vector r may be represented in generalized polar coordinates as $$r = \begin{bmatrix} \cos(\theta_1) \\ \sin(\theta_1)\cos(\theta_2) \\ \vdots \\ \sin(\theta_1)\sin(\theta_2) \ldots \cos(\theta_{M-1}) \\ \sin(\theta_1)\sin(\theta_2) \ldots \sin(\theta_{M-1}) \end{bmatrix},$$

where $r_1 = \cos(\theta_1)$, $r_k = \prod_{l=1}^{k-1} \sin(\theta_l)\cos(\theta_k)$ $1 \leq k \leq M-1, \ldots$, $r_M = \sin(\theta_1)\sin(\theta_2) \ldots \sin(\theta_{M-1})$, $0 \leq \theta_k < \pi$.

Therefore, the channel estimate h may be parameterized by principal angles $\Theta$ and $\Phi$, where $\Theta=[\theta_1\ \theta_2\ \ldots\ \theta_{M-1}]^T$ and $\Phi=[\phi_1\ \phi_2\ \ldots\ \phi_{M-1}]^T$ which all belong to the interval $[0\ \pi)$.

With the channel estimate h parameterized and transformed, quantization may be performed (block 215). The principal angles $\theta_1 \theta_2 \ldots \theta_{M-1}$ and $\phi_1 \phi_2 \ldots \phi_{M-1}$ may be quantized each by $L_\theta$ and $L_\phi$ bits, respectively. Therefore, a total number of bits used to quantize the channel estimate h is:

$$L_{total} = (L_\theta + L_\phi)(M-1).$$

For example, if $L_\theta = L_\phi = 2$ and $M=4$, then $L_{total} = 12$ bits. Although the discussion focuses on an example where $L_\theta = L_\phi$, the quantization of the principal angles do not have to be performed to the same number of bits. There may be situations wherein a higher degree of resolution may be desired for phase angle rather than amplitude. In such a situation, one of the two principal angles may be quantized to a higher number of bits.

The optimal quantization thresholds can be found using the well-known vector quantization methods such as Lloyd's algorithm, for example. However, for the sake of simplicity, consider a uniform quantizer over the interval $[0\ \pi)$ for each angle. Although the discussion focuses on the use of a uniform quantizer, other types of quantizers may be used. Therefore, the discussion of a uniform quantizer should not be construed as being limiting to either the scope or the spirit of the embodiments. Let $N_\theta = 2^{L_\theta}$ and $N_\phi = 2^{L_\phi}$, then $$\hat{\theta}_k = \left\lfloor \frac{\theta_k N_\theta}{\pi} + 0.5 \right\rfloor \frac{\pi}{N_\theta}, 1 \le k \le M-1$$

$$\hat{\varphi}_k = \left\lfloor \frac{\varphi_k N_\varphi}{\pi} + 0.5 \right\rfloor \frac{\pi}{N_\varphi}.$$

Represent the quantized values for the principal angles as $\hat{\theta}_1 \hat{\theta}_2 \ldots \hat{\theta}_{M-1}$ and $\hat{\phi}_1 \hat{\phi}_2 \ldots \hat{\phi}_{M-1}$. An advantage of a uniform quantization is that there is only a need to store $N_{max} = \max(N_\theta, N_\phi)$ threshold values (real numbers). At a slightly increased storage cost, different threshold values for different angles may be used.

The quantized values may then be transmitted to the BTS (block 220) and subscriber unit operations 200 may terminate. In a preferred embodiment, bits representing the quantized values may be transmitted to the BTS instead of the quantized values themselves.

FIG. 3 illustrates a flow diagram of BTS operations 300 in using channel state information in transmitting information to a subscriber unit. BTS operations 300 may be indicative of operations taking place in a BTS, such as BTS 101, as the BTS makes use of channel state information provided by a subscriber unit, such as subscriber unit 105, to adjust its transmitter to improve transmit spectral efficiency of transmissions to the subscriber unit. BTS operations 300 may be performed periodically, such as once during each frame or superframe. Alternatively, BTS operations 300 may be performed once every few frames or superframes. Alternatively, BTS operations 300 may be performed in response to the occurrence of an event. For example, BTS operations 300 may be performed when a performance metric, such as an error rate of some form (frame error rate, bit error rate, packet error rate, and so forth), meets or exceeds a threshold.

BTS operations 300 may begin when the BTS receives values from a subscriber unit (let $\hat{\theta}_1 \hat{\theta}_2 \ldots \hat{\theta}_{M-1}$ and $\hat{\phi}_1 \hat{\phi}_2 \ldots \hat{\phi}_{M-1}$ represent the quantized values of the principal angles transmitted by the subscriber unit and received at the BTS), wherein the values are a representation of a quantized channel estimate of a channel between the BTS and the subscriber unit (block 305). In a preferred embodiment, bits representing the quantized values are received by the BTS instead of the quantized values themselves. In MIMO systems, the BTS may receive multiple sets of values, with each set of values representing a single channel. Therefore, if the BTS and the subscriber unit have a large number of antennas, then the BTS may receive a large number of sets of values.

Using the received values ($\hat{\theta}_1 \hat{\theta}_2 \ldots \hat{\theta}_{M-1}$ and $\hat{\phi}_1 \hat{\phi}_2 \ldots \hat{\phi}_{M-1}$), the BTS may reconstruct the channel estimate, $\hat{h}$, for each channel (block 310). Unlike a typical codebook implementation, no search is required to reconstruct the channel estimate. Instead, the formula used to parameterize the channel estimate h at the subscriber unit may be used to reconstruct the quantized channel estimate, $\hat{h}$:

$$\hat{r}_1 = \cos(\hat{\theta}_1),$$

$$\hat{r}_k = \prod_{l=1}^{k-1} \sin(\hat{\theta}_l)\cos(\hat{\theta}_k)\ 1 \le k \le M-1,$$

$$\hat{r}_M = \sin(\hat{\theta}_1)\sin(\hat{\theta}_2) \ldots \sin(\hat{\theta}_{M-1})$$

$$\hat{h} = \begin{bmatrix} \hat{r}_1 e^{j\hat{\varphi}_1} \\ \hat{r}_2 e^{j\hat{\varphi}_2} \\ \vdots \\ \hat{r}_M \end{bmatrix}.$$

To further simplify the reconstruction of the quantized channel estimate, sine and cosine functions required in the reconstruction may be precomputed and stored in a memory (such as a look-up table, for example) at the BTS.

The reconstructed channel estimate $\hat{h}$ may be used to adjust BTS transmitter parameters (block 315). For example, the reconstructed channel estimate $\hat{h}$ may be used to adjust a precoding matrix used at the BTS's transmitter. The BTS may then transmit information to the subscriber unit using its adjusted transmitter (block 320) and BTS operations 300 may terminate.

As discussed above, each channel between the BTS and the subscriber unit may have a different channel estimate (and hence, a different reconstructed channel estimate). The BTS may reconstruct channel estimates for each of the channels between itself and the subscriber unit prior to transmitting information to the subscriber unit.

Figure 4A:
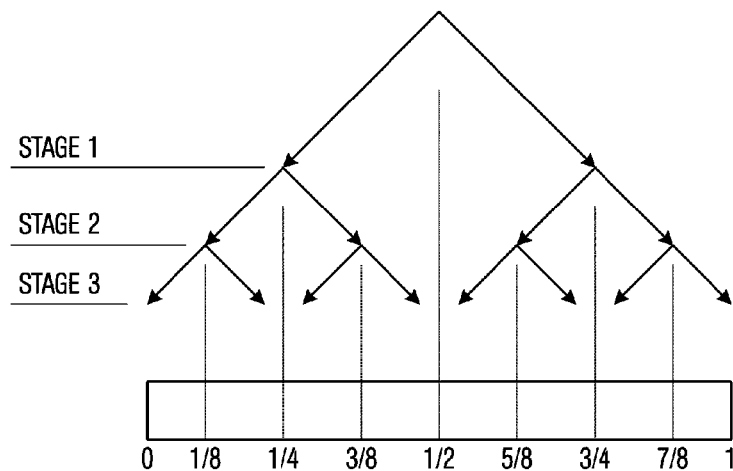
FIG. 4a is a diagram of a multi-stage structure for use in multi-scale quantization of channel state information.

FIG. 4a illustrates a multi-stage structure for use in multi-scale quantization of channel state information. The uniform quantizer discussed above provides a simple way to quantize the principal angles of the channel estimate vector h in a multi-scale manner. The use of multi-scale quantization preferably enables the sending of feedback information in multiple stages, with each stage corresponding to a quantization scale. As shown in FIG. 4a, the channel estimate vector h may be quantized in three stages.

The result of each stage's quantization may result in a progressively more accurate quantization of the principal angles. For example, in a three-stage quantization with total of three bits representing of each principal angle, in an initial quantization stage, a most significant bit may be produced for each principal angle. Then in a second quantization stage, a second most significant bit is produced for each principal angle. Finally, in a third quantization stage, each principal angle's least significant bit is produced.

For example if $L_\theta = L_\phi = 2$ and $M=4$, then it may be possible to send 12 bits of channel state information in two 6-bit stages, the first stage carries the coast level (with 1-bit per angle) information and the second stage provides the refinement information. The first stage may be transmitted back to the BTS during a first time that the subscriber unit is expected to transmit channel state information and the second stage may be transmitted back to the BTS during a second time that the subscriber unit is expected to transmit channel state information.

Figure 4B:
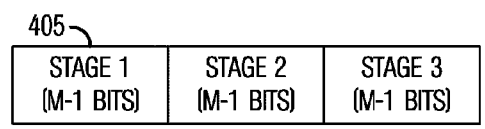
FIG. 4b is a diagram of multi-stage quantized channel state information feedback.

FIG. 4b illustrates multi-stage quantized channel state information feedback. As shown in FIG. 4b, quantized channel state information for configuration $L_\theta = L_\phi = 3$ and M=4. Each stage, such as stage 1 405 may contain M−1 (or three (3)) bits.

Figures 5, 6:
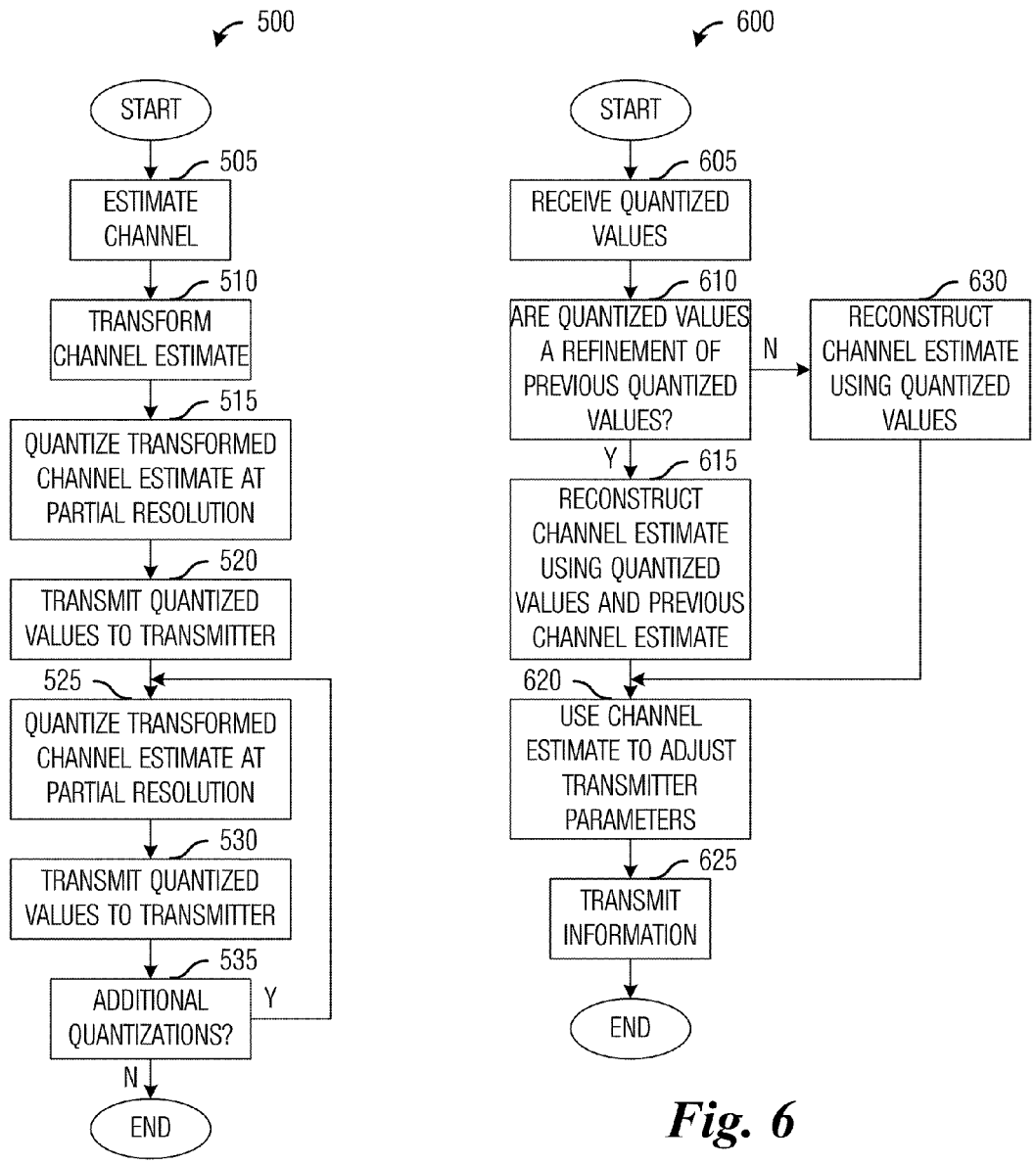
FIG. 5 is a flow diagram of subscriber unit operations in providing multi-scale quantization of channel state information to a BTS.
FIG. 6 is a flow diagram of BTS operations in using multi-scale quantization of channel state information in transmitting information to a subscriber unit.

FIG. 5 illustrates a flow diagram of subscriber unit operations 500 in providing multi-scale quantization of channel state information to a BTS. Subscriber unit operations 500 may be indicative of operations taking place in a subscriber unit, such as subscriber unit 105, as the subscriber unit provides channel state information to a BTS, such as BTS 101. Subscriber unit operations 500 may be performed periodically, such as once during each frame or superframe. Alternatively, subscriber unit operations 500 may be performed once every few frames or superframes. Alternatively, subscriber unit operations 500 may be performed in response to the occurrence of an event. For example, subscriber unit operations 500 may be performed when a performance metric, such as an error rate of some form (frame error rate, bit error rate, packet error rate, and so forth), meets or exceeds a threshold.

Subscriber unit operations 500 may begin when the subscriber unit computes a channel estimate (block 505). The subscriber unit may compute the channel estimate by measuring pilots transmitted by the BTS, measuring reference sequences transmitted by the BTS, or by measuring transmissions made by the BTS over time.

After the subscriber unit computes the channel estimate, the subscriber unit may parameterize and then transform the channel estimate (block 510) and quantize the transformed channel estimate (the partial angles) at a partial resolution (block 515). As an example, the quantization performed in block 515 may produce one, two, three, and so on, bits, where the number of bits produced by the quantization is a fraction of a total number of bits to be used to quantize the principal angles. The subscriber unit may then transmit the bits representing the quantized principal angles to the BTS (block 520). In a preferred embodiment, bits representing the quantized principal angles may be transmitted to the BTS instead of the quantized principal angles themselves. Typically, with multi-scale quantization at each quantization stage the quantization being performed produces an equal number of bits. In an alternative embodiment, each stage of quantization in multi-scale quantization may produce a different number of bits.

The subscriber unit may then perform a subsequent quantization of the principal angles at a partial resolution (block 525) and the bits produced in the subsequent quantization may be transmitted to the BTS (block 530). A check may be performed to determine if additional stages of quantization are to be performed (block 535). If additional stages of quantization are to be performed, then the subscriber unit may return to blocks 525 and 530 to quantize the principal angles of the channel estimate and transmit the quantized principal angles (or bits representing the quantized principal angles to the BTS. If there are no more additional stages of quantization, then subscriber unit operations 500 may terminate.

FIG. 6 illustrates a flow diagram of BTS operations 600 in using multi-scale quantization of channel state information in transmitting information to a subscriber unit. BTS operations 600 may be indicative of operations taking place in a BTS, such as BTS 105, as the BTS makes use of channel state information provided by a subscriber unit, such as subscriber unit 105, to adjust its transmitter to improve transmit spectral efficiency of transmissions to the subscriber unit. BTS operations 600 may be performed periodically, such as once during each frame or superframe. Alternatively, BTS operations 600 may be performed once every few frames or superframes. Alternatively, BTS operations 600 may be performed in response to the occurrence of an event. For example, BTS operations 600 may be performed when a performance metric, such as an error rate of some form (frame error rate, bit error rate, packet error rate, and so forth), meets or exceeds a threshold.

BTS operations 600 may begin when the BTS receives quantized values from a subscriber unit (let $\hat{\theta}_1 \hat{\theta}_2 \ldots \hat{\theta}_{M-1}$ and $\hat{\phi}_1 \hat{\phi}_2 \ldots \hat{\phi}_{M-1}$ represent the quantized values of the principal angles transmitted by the subscriber unit and received at the BTS), wherein the quantized values are a representation of a quantized channel estimate of a channel between the BTS and the subscriber unit (block 305). In a preferred embodiment, bits representing the quantized values are received by the BTS instead of the quantized values themselves.

With multi-scale quantization, the received values may be from an initial stage of quantization or a subsequent stage of quantization. The BTS may perform a check to determine the nature of the received values, i.e., the BTS determines if the received quantized values from an initial stage of quantization or from a subsequent stage of quantization (block 610).

If received values are from a subsequent stage of quantization, the BTS may reconstruct the principal angles of the channel estimate using the received quantized values and the previously reconstructed channel estimate (block 615). For example, if in each stage of quantization, a single bit of information is quantized, then for a reconstruction using N-th stage of quantization values, the BTS may be able to make use of the N-th most significant bit of the principal angles received from the subscriber unit to refine the reconstructed channel estimate $\hat{h}$. The BTS may then use the reconstructed channel estimate $\hat{h}$ may be used to adjust BTS transmitter parameters (block 620). For example, the reconstructed channel estimate $\hat{h}$ may be used to adjust a precoding matrix used at the BTS's transmitter. The BTS may then transmit information to the subscriber unit using its adjusted transmitter (block 625) and BTS operations 600 may terminate.

If received quantized values are from an initial stage of quantization, the BTS may reconstruct the principal angles of the channel estimate using the received quantized values, which in multi-scale quantization may only be one or more of most significant bits of the principal angles (block 615). The BTS may then use the reconstructed channel estimate $\hat{h}$ may be used to adjust BTS transmitter parameters (block 620). The BTS may then transmit information to the subscriber unit using its adjusted transmitter (block 625) and BTS operations 600 may terminate.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for operating in a wireless communications system, the wireless communications network having a controller and a mobile device, the method comprising:
   estimating a communications channel between the controller and the mobile device, thereby producing a channel estimate;
   parameterizing the channel estimate with principal angles, thereby producing principal angle vectors Θ and Φ;
   quantizing the principal angle vectors, thereby producing quantized values, wherein quantizing the principal angle vectors is performed without using a codebook; and
   transmitting the quantized values to the controller,
   wherein quantizing the principal angle vector comprises quantizing the principal angle vectors with a uniform quantizer over interval [0 π), and, wherein the quantized values are expressible as:

$$\hat{\theta}_k = \left\lfloor \frac{\theta_k N_\theta}{\pi} + 0.5 \right\rfloor \frac{\pi}{N_\theta}, 1 \le k \le M-1$$

$$\hat{\varphi}_k = \left\lfloor \frac{\varphi_k N_\varphi}{\pi} + 0.5 \right\rfloor \frac{\pi}{N_\varphi},$$

where $N_\theta = 2^{L_\theta}$ and $N_\varphi = 2^{L_\varphi}$, $L_\theta$ and $L_\varphi$, are the number of quantization bits for the principal angle vectors.

2. The method of claim 1, wherein transmitting the quantized values to the controller comprises transmitting bits representing the quantized values to the controller.

3. The method of claim 1, wherein estimating a communications channel comprises:
   measuring a transmission made by the controller; and
   computing the channel estimate based on measurements of the transmission.

4. The method of claim 3, wherein the transmission comprises a pilot sequence or a reference sequence.

5. The method of claim 1, wherein the channel estimate is defined in a first coordinate plane, and wherein parameterizing the channel estimate comprises:
   parameterizing the channel estimate as a rotated m-dimensional unit norm real vector; and
   transforming the parameterized channel estimate into a second coordinate plane.

6. A method for operating in a wireless communications system, the wireless communications network having a controller and a mobile device, the method comprising:
   estimating a communications channel between the controller and the mobile device, thereby producing a channel estimate;
   parameterizing the channel estimate with principal angles, thereby producing principal angle vectors Θ and Φ;
   quantizing the principal angle vectors, thereby producing quantized values, wherein quantizing the principal angle vectors is performed without using a codebook; and
   transmitting the quantized values to the controller,
   wherein the channel estimate is defined in a first coordinate plane,
   wherein parameterizing the channel estimate comprises:
   parameterizing the channel estimate as a rotated m-dimensional unit norm real vector; and transforming the parameterized channel estimate into a second coordinate plane, and
   wherein parameterizing the channel estimate as a rotated m-dimensional unit norm real vector comprises expressing the channel estimate as:

$$h = e^{j\psi} \begin{bmatrix} r_1 e^{j\varphi_1} \\ r_2 e^{j\varphi_2} \\ \vdots \\ r_M \end{bmatrix},$$

where $$\sum_{k=1}^{M} |r_k|^2 = 1, r_k \in \mathbb{R}, 0 \le \varphi_k < \pi,$$

and vector $r = [r_1 \, r_2 \ldots r_M]^T$ is an m-dimensional unit norm real vector.

7. A method for operating in a wireless communications system, the wireless communications network having a controller and a mobile device, the method comprising:
   estimating a communications channel between the controller and the mobile device, thereby producing a channel estimate;
   parameterizing the channel estimate with principal angles, thereby producing principal angle vectors Θ and Φ;
   quantizing the principal angle vectors, thereby producing quantized values, wherein quantizing the principal angle vectors is performed without using a codebook; and
   transmitting the quantized values to the controller,
   wherein the channel estimate is defined in a first coordinate plane,
   wherein parameterizing the channel estimate comprises:
   parameterizing the channel estimate as a rotated m-dimensional unit norm real vector; and transforming the parameterized channel estimate into a second coordinate plane, and
   wherein transforming the parameterized channel estimate comprises:
   representing the rotated m-dimensional unit norm real vector in generalized polar coordinates; and
   parameterizing the rotated m-dimensional unit norm real vector in generalized polar coordinates with the principal angle vectors Θ and Φ, where $\Theta = [\theta_1 \, \theta_2 \ldots \theta_{M-1}]^T$ and $\Phi = [100_1 \, \varphi_2 \ldots \varphi_{M-1}]^T$ which all belong to the interval [0 π).

8. The method of claim 7, wherein the rotated m-dimensional unit norm real vector in generalized polar coordinates is expressed as:

$$r = \begin{bmatrix} \cos(\theta_1) \\ \sin(\theta_1)\cos(\theta_2) \\ \vdots \\ \sin(\theta_1)\sin(\theta_2) \ldots \cos(\theta_{M-1}) \\ \sin(\theta_1)\sin(\theta_2) \ldots \sin(\theta_{M-1}) \end{bmatrix},$$

where $r_1 = \cos(\theta_1)$,

-continued $$r_k = \prod_{l=1}^{k-1} \sin(\theta_l)\cos(\theta_k) \; 1 \leq k \leq M-1, \ldots,$$

$$r_M = \sin(\theta_1)\sin(\theta_2) \ldots \sin(\theta_{M-1}), 0 \leq \theta_k < \pi.$$

9. The method of claim 1 wherein $L_\theta$ and $L_\Phi$, are equal.

10. A method for operating in a wireless communications system, the wireless communications network having a controller and a mobile device, the method comprising:
receiving quantized values of a channel estimate from the mobile device, wherein the received quantized values comprise quantized principal angle vectors;
reconstructing the channel estimate from the quantized principal angle vectors;
adjusting a transmitter of the controller using the channel estimate; and
using the adjusted transmitter to transmit to the mobile device,
wherein reconstructing the channel estimate comprises evaluating the following expression:

$$\hat{h} = \begin{bmatrix} \hat{r}_1 e^{j\hat{\varphi}_1} \\ \hat{r}_2 e^{j\hat{\varphi}_2} \\ \vdots \\ \hat{r}_M \end{bmatrix},$$

and $$\hat{r}_1 = \cos(\hat{\theta}_1),$$

$$\hat{r}_k = \prod_{l=1}^{k-1} \sin(\hat{\theta}_l)\cos(\hat{\theta}_k) \; 1 \leq k \leq M-1,$$

$$\hat{r}_M = \sin(\hat{\theta}_1)\sin(\hat{\theta}_2) \ldots \sin(\hat{\theta}_{M-1}),$$

where $\hat{\theta}_1 \hat{\theta}_2 \ldots \hat{\theta}_{M-1}$ and $\hat{\varphi}_1 \hat{\varphi}_2 \ldots \hat{\varphi}_{M-1}$ are the received quantized values.

11. The method of claim 10, wherein receiving quantized values of a channel estimate comprises receiving bits representing quantized values of a channel estimate.

12. The method of claim 10, wherein the sine and cosine values are precomputed and stored in a memory.

13. The method of claim 10, wherein the reconstructed channel estimate is used to adjust the transmitter of the controller only for transmissions made to the mobile device.

14. A method for operating in a wireless communications system, the wireless communications network having a controller and a mobile device, the method comprising:
a) estimating a communications channel between the controller and the mobile device, thereby producing a channel estimate;
b) parameterizing the channel estimate with principal angles, thereby producing principal angle vectors Θ and (Φ);
c) quantizing the principal angle vectors at a first partial resolution without using a codebook, thereby producing a first set of quantized values;
d) transmitting the first set of quantized values to the controller;
e) quantizing the principal angle vectors at a second partial resolution without using a codebook, thereby producing a second set of quantized values; and
f) transmitting the second set of quantized values to the controller.

15. The method of claim 14, wherein quantizing the principal angle vectors at a first partial resolution and quantizing the principal angle vectors at a second partial resolution each comprises quantizing the principal angle vectors with a uniform quantizer over interval [0 π).

16. The method of claim 14, further comprising:
quantizing the principal angle vectors at a third partial resolution, thereby producing a third set of quantized values; and
transmitting bits representing the third set of quantized values to the controller.

17. The method of claim 14, wherein a sum of the first partial resolution and the second partial resolution is equal to a quantization resolution used for quantizing of the principal angle vectors in a single step.

18. The method of claim 14, wherein the first partial resolution and the second partial resolution are equal.

19. The method of claim 14, wherein the steps c) and d) occur at a first time when the mobile device is to report channel information and the steps e) and f) occur at a second time when the mobile device is to report channel information.

20. A communications device comprising:
an estimating unit configured to estimate a communications channel between a controller and the communications device, thereby producing a channel estimate;
a parameterizing unit coupled to the estimating unit, the parameterizing unit configured to parameterize the channel estimate with principal angles, thereby producing principal angle vectors Θ and Φ;
a quantizer coupled to the parameterizing unit, the quantizer configured to quantize the principal angle vectors without using a codebook, thereby producing quantized values; and
a transmitter coupled to the quantizer, the transmitter configured to transmit the quantized values to the controller,
wherein the channel estimate is defined in a first coordinate plane,
wherein the parameterizing unit is configured to parameterize the channel estimate as a rotated m-dimensional unit norm real vector,
wherein the parameterizing unit comprises a transforming unit configured to transform the parameterized channel estimate into a second coordinate plane,
wherein the transforming unit comprises a representation unit configured to represent the rotated m-dimensional unit norm real vector in generalized polar coordinates, and wherein the parameterizing unit is further configured to parameterize the rotated m-dimensional unit norm real vector in generalized polar coordinates with the principal angle vectors Θ and Φ,
where $\Theta = [\theta_1 \theta_2 \ldots \theta_{M-1}]^T$ and $\Phi = [\phi_1 \phi_2 \ldots \phi_{M-1}]^T$ which all belong to an interval [0 π).

21. The communications device of claim 20, wherein the estimating unit comprises:
a measuring unit configured to measure a transmission made by the controller; and
a computing unit coupled to the measuring unit, the computing unit configured to compute the channel estimate based on measurements of the transmission.

* * * * *